United States Patent [19]
Kim

[11] Patent Number: 5,682,373
[45] Date of Patent: Oct. 28, 1997

[54] OPTICAL PICKUP DEVICE

[75] Inventor: Kwang Kim, Seoul, Rep. of Korea

[73] Assignee: Goldstar Co., Ltd., Seoul, Rep. of Korea

[21] Appl. No.: 392,683

[22] Filed: Feb. 23, 1995

Related U.S. Application Data

[63] Continuation of Ser. No. 54,589, May 3, 1993, abandoned.

[30]   Foreign Application Priority Data

May 13, 1992 [KR] Rep. of Korea ............... 8097/1992

[51] Int. Cl.$^6$ ................................................. G11B 7/135
[52] U.S. Cl. .................. 369/112; 369/44.14; 369/176; 369/244
[58] Field of Search .................. 369/44.11, 44.12, 369/44.14, 44.23, 44.24, 112, 110, 109, 111, 32, 244, 273.3, 199, 44.37

[56]   References Cited

U.S. PATENT DOCUMENTS

| 4,387,452 | 6/1983 | Bricot et al. ............... 369/32 |
| 5,168,486 | 12/1992 | Yanagawa ............... 369/44.14 |

FOREIGN PATENT DOCUMENTS

| 60-239945 | 11/1985 | Japan ............... 369/100 |
| 63-197038 | 8/1988 | Japan ............... 369/112 |
| 1-276441 | 11/1989 | Japan . |

*Primary Examiner*—Stuart S. Levy
*Assistant Examiner*—William J. Klimowicz

[57]   ABSTRACT

An optical pickup device capable of accessing, using one pickup device, two opposed discs without turning the pickup device over. The pickup device includes a light source; a beam splitter for dividing a beam into two linearly polarized beams, a reflecting prism for making the two linearly polarized beams parallel, a total reflection prism for concurrently receiving the two parallel beams and reflecting the light upwards and downwards, respectively; upper and lower quarter-wavelength plates for converting the two respective beams into circularly polarized beams, objective lenses which are movable in horizontal and vertical directions by focusing and tracking coils for focusing the light on the optical discs and for returning reflected light therefrom to the total reflection prism, respectively; a partial reflection prism for transmitting a portion of the incident light but reflecting the remaining portion of the incident light; a tracking optical detector for detecting and converting the light transmitted through the partial reflection prism into an electric signal; and a focusing optical detector for detecting and converting the light, reflected by the half prism, into the form of an electric signal. Either the upper or lower optical disk is accessed by defocusing the focus of the beam incident on the other disc.

14 Claims, 3 Drawing Sheets

OPTICAL PICKUP DEVICE

This application is a continuation of application Ser. No. 08/054,589 filed on May 3, 1993, now abandoned.

BACKGROUND OF THE INVENTION

1. Field of the Invention

The present invention relates in general to an optical disc recorder/player, and more particularly to an optical pickup device of an optical disc recorder/player suitable for use in accessing lay-built optical discs.

2. Description of the Background Art

With reference to FIG. 1, there is shown a conventional optical disc recorder/player. The conventional optical disc recorder/player includes an optical disc 1, fitted around a rotatable shaft 1a which is driven by a spindle motor 2. The spindle motor 2 rotates the optical disc 1 at a predetermined linear velocity and at a predetermined angular velocity under the control of a spindle motor control unit 3. A coil 4 is provided above the optical disc 1 to generate a magnetic field when data is recorded on the optical disc. When generating the magnetic field, current direction within the coil 4 as well as its driving time are controlled by a coil current control unit 5 responsive to a recording signal outputted from a main controller 8.

In addition, an optical pickup device 6 is arranged under the optical disc 1. This pickup device 6 includes a light source 6a and an optical system 6b, combined with each other in a housing. The light source 6a emits a light to the optical system 6b which condenses the light and applies it to a bottom layer, i.e., a recording layer, of the optical disc 1 and detects the optical data from the light reflected by the optical disc 1 in the form of a current signal. The optical pickup device 6 moves in vertical and horizontal directions with respect to the bottom layer of the optical disc 1 under the control of a focusing/tracking control unit 7, thereby achieving focusing and tracking.

The main controller 8, connected to an outside signal processing unit, controls the spindle motor control unit 3, the coil current control unit 5, the light source 6a and the focusing/tracking control unit 7. This main controller 8 also records data signals on the optical disc 1 and plays back the recorded data signals.

FIG. 2 is a detailed illustration of the optical pickup device 6 of the conventional optical disc recorder/player of FIG. 1. The pickup device 6 includes the light source 6a which generates light for accessing the optical disc 1, and a collimating lens 11, disposed at the front of the light source 6a to convert the light of the light source 6a into a collimated beam. At the front of the collimating lens 11, a polarized beam splitter 12, a quarter-wavelength plate 13 and an objective lens 14 are arranged one after another. The beam splitter 12 transmits the P-wave of the incident beam but reflects the S-wave of the incident beam. The quarter-wavelength plate 13 transmits a polarized light, which has been transmitted through the beam splitter 12 or reflected by the optical disc 1, while performing conversion of a linearly polarized light into a circularly polarized light or conversion of the circularly polarized light into the linearly polarized light. The objective lens 14 condenses the incident light from the quarter-wavelength plate 13 into one-point of light which is focused on the bottom layer of the optical disc 1. This objective lens 14 also converts the light reflected by the optical disc 1 into collimated light and returns this collimated light to the beam splitter 12 through the quarter-wavelength plate 13. In addition, a condensing lens 15, a half prism 16, a tracking optical detector 19 and a focusing optical detector 18 are arranged to the side of the beam splitter 12. The condensing lens 15 condenses the light into a spot beam, which has been reflected by the beam splitter 12. The half prism 16 transmits half of the spot beam of the condensing lens 15 but reflects the other half. The tracking optical detector 19 detects light reflected by the half prism 16 in the form of an electric signal, while the focusing optical detector 18 receives the light, transmitted through the half prism 16, by way of a cylindrical lens 17 and detects the light in the form a second electric signal. Both electric signals are received by the main controller 8.

In FIG. 2, the reference numerals 14a and 14b denote a focusing coil and a tracking coil, respectively.

In the operation of the above optical disc recorder/player, simultaneously with driving the light source 6a, the main controller 8 controls the spindle motor control unit 3 to drive the spindle motor 2. Hence, the optical disc 1 is rotated at the predetermined linear velocity and at the predetermined angular velocity. Thereafter, the main controller 8 controls the focusing/tracking control unit 7 in accordance with focusing/tracking signals detected by the optical pickup device 6, so that it controls the focusing coil 14a as well as the tracking coil 14b of the optical pickup device 6 for performing focusing and tracking operations.

In this case, the main controller 8 in the recording mode outputs a control signal to the coil control unit 5 in response to input digital data at the same time of controlling the quantity of light from the light source 6a. However in the case of playback mode, the main controller 8 reduces the quantity of light provided by the light source 6a to a predetermined level corresponding to the playback mode and demodulates the analog signal detected by the optical pickup device 6 into a digital signal. This digital signal is outputted to the outside signal processing unit.

In the optical pickup device 6, the light of the light source 6a is collimated by the collimating lens 11 to be a collimated beam which is in turn received by the beam splitter 12. Since the beam splitter 12 transmits the P-wave component to the incident surface but reflects the S-wave component normal to the incident surface, it transmits only the P-wave of the incident beam. The P-wave light is received by the quarter-wavelength plate 13. Upon reception of the P-wave light, the quarter-wavelength plate 13 converts the linearly polarized P-wave light into circularly polarized light. The circularly polarized light is, thereafter, focused on the optical disc 1 by the objective lens 14.

The reflection quantity of the light, focused on the optical disc 1, as well as its angle of diffraction is determined, in accordance with predetermined recording signal characteristics of the optical disc recording layer. When the light is reflected by the optical disc 1, it is diffracted in a direction opposite to that of the incident light and reflected in the form of a circularly polarized light normal to the incident surface.

The circularly polarized light reflected by the optical disc 1 is received by the quarter-wavelength plate 13 by way of the objective lens 14. At the quarter-wavelength plate 13, the circularly polarized light is converted into linearly polarized light and received by the beam splitter 12 where the light is reflected to the half prism 16 by way of the condensing lens 15. At the half prism 16, half of the incident light is reflected to the tracking optical detector 19 while the other half of the incident light is transmitted to the focusing optical detector 18 by way of the cylindrical lens 17. Upon reception of the light, each of the focusing optical detector 18 and the tracking optical detector 19 detects and converts the optical data of the incident light into the form of an electric signal, and outputs the signal to the main controller 8.

Upon reception of the electric data signals outputted from the detectors 18 and 19, the main controller 8 controls both focusing and tracking operations according to the electric data signals. At the same time of the above control, the main controller 8 in the recording mode controls the drive current of the coil 4 in response to an input recording signal outputted from the outside signal processing unit. However in the case of playback mode, the main controller 8 demodulates the input analog signal detected by the optical pickup device 6 into a digital signal, and outputs this digital signal to an outside signal processing unit.

The light source of the above optical pickup device generates the light beam in such a manner that each light source generates only one beam. In this regard, in order to access, employing the known optical pickup device, upper and lower optical discs of a lay-built structure where two optical discs are fitted around the rotatable shaft one after another, it is required to use one optical pickup device which is capable of being turned over or to use two optical pickup devices.

However, the use of one optical pickup device which is capable of being turned over requires an additional system for turning the pickup device over, thereby causing a problem in that the pickup device is increased in size and structure complication. Furthermore, the use of one optical pickup device results in lengthened access waiting time.

On the other hand, the use of two optical pickup devices results in increased size as well as installation space, and involves capital investment.

SUMMARY OF THE INVENTION

It is, therefore, an object of the present invention to provide an optical pickup device in which the aforementioned problems can be overcome and which accesses, using one optical pickup device provided with one light source, upper and lower optical discs of a lay-built structure without turning the optical pickup device over.

To accomplish the above-mentioned object, an optical pickup device of the present invention includes a light source; a beam splitter for transmitting, upon receiving the light of the light source through a collimating lens, the P-polarized light component and for reflecting the S-polarized component a reflection prism for reflecting the light reflected by the beam splitter, a total reflection prism for reflecting in opposite collinear directions the s and p component light transmitted from the beam splitter; upper and lower quarter-wavelength plates arranged on paths above and below the total reflection prism, respectively, to convert the linearly polarized light beams into circularly polarized light beams and for converting returning circularly polarized light beams into linear polarized light beams; upper and lower objective lenses being movable in the horizontal and vertical directions to the proportion path under the control of focusing coils and tracking coils and focusing the light on recording layers of upper and lower optical discs, and returning the reflection light beams of the upper and lower optical discs to the beam splitter, respectively; a partial reflection prism for receiving the light beams reflected by the upper and lower optical discs and reflected by the beam splitter and the light transmitted through the beam splitter and received thereby through a condensing lens, and transmitting a portion, such as half of the incident light and reflecting the other portion of the incident light; a tracking optical detector for detecting and converting the light, transmitted through the prism, into the form of an electric signal and a focusing optical detector for receiving the light, reflected by the prism by way of a cylindrical lens, and detecting and converting the light into the form of an electric signal.

The above optical pickup device uses the S-wave, reflected by the beam splitter, as well as the P-wave to access to optical discs differently than the conventional system where only the P-wave is used in the access of the optical disc, thereby achieving, using one optical pickup device provided with one light source, access to lay-built optical discs, fitted around a rotatable shaft one above another, without turning the pickup device over.

In accordance with the present invention, the light of the light source is split into two light beams by the beam splitter such that the P-wave is transmitted through the beam splitter frontwards and the S-wave is reflected by the beam splitter and in turn reflected frontwards by the reflection mirror. The P-wave and the S-wave are reflected by the upper and lower reflection surfaces of the total reflection prism, respectively, and focused on the upper and lower optical discs by way of the upper and lower quarter-wavelength plates and the upper and lower objective lenses, respectively. The reflection light of the upper and lower optical discs are returned to the beam splitter through individual optical paths opposite to those of the incident paths. At the beam splitter, the incident light is combined into a light beam and applied to the tracking and focusing optical detectors through the condensing lens and the half prism.

At this time, the P-component light transmitted through the beam splitter is converted, when it is returned, into S-component light that is reflected by the beam splitter. On the contrary, the S-component light, reflected by the beam splitter, is converted, when it is returned, into P-component light and transmitted through the beam splitter. Hence, the light, respectively reflected by the upper and lower optical discs, are combined into one light beam by the beam splitter and received by the condensing lens.

When it is required to access information on the upper optical disc, the focus on the lower optical disc is deflected by controlling the lower objective lens focusing coil so as to defocus the reflection light of the lower optical disc. In the same manner, the focus on the upper optical disc, when it is required to access the lower optical disc, is deflected by controlling the upper objective lens focusing coil in order to defocus the reflection light of the upper optical disc.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, which are given by way of illustration only and thus are not limitative of the present invention, and in which.

DESCRIPTION OF THE PREFERRED EMBODIMENTS

Figure 1:
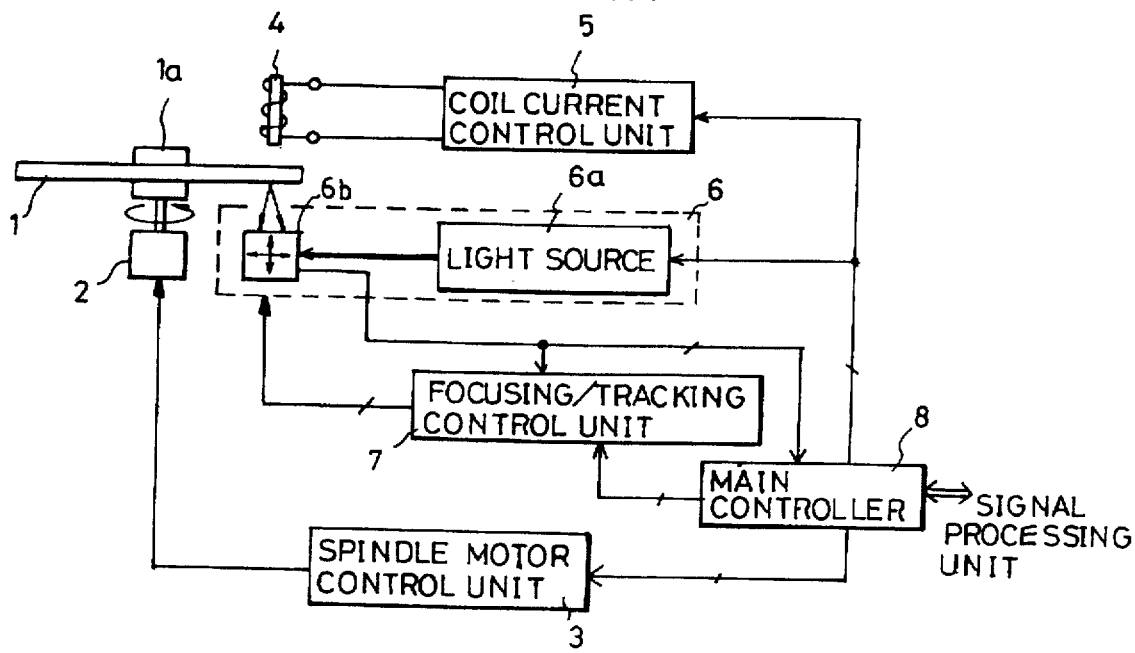
FIG. 1 is a schematic diagram showing a conventional optical disc recorder/player.
Figure 2:
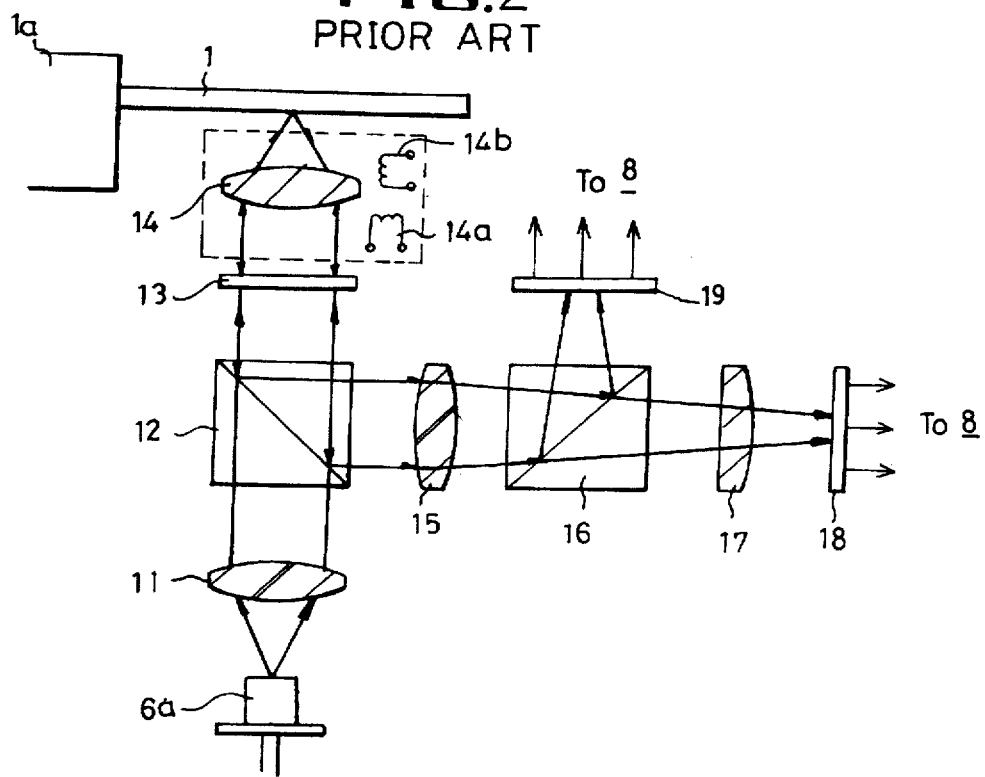
FIG. 2 is a view showing a structure of an optical pickup device of the conventional optical disc recorder/player.
Figure 3:
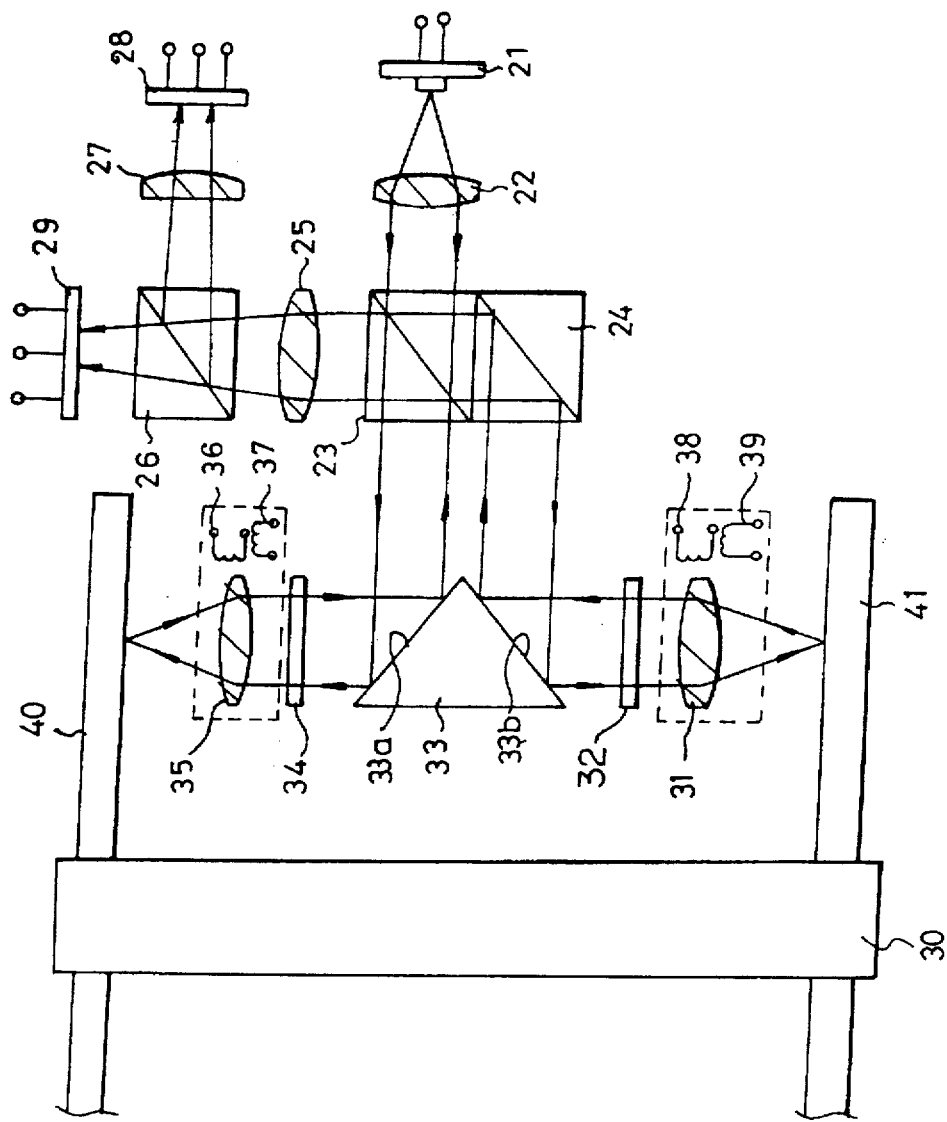
FIG. 3 is a view showing a structure of an optical pickup device of an optical disc recorder/player according to an embodiment of the present invention.

Referring to FIG. 3, there is shown an optical pickup device of an optical disc recorder/player according to an embodiment of the present invention. The optical pickup device includes a light source 21 and a collimating lens 22 disposed at the front of the light source 21 to convert the light of the light source 21 into a collimated beam. At the front of the collimating lens 22, a beam splitter 23 is arranged to transmit P-wave polarized light parallel to the incident surface and to reflect S-wave polarized light normal to the incident surface. A reflection mirror 24 is arranged at a side of the beam splitter 23 to reflect the light from the beam splitter 23, to the front of the beam splitter 23. At the front of the beam splitter 23, a total reflection prism 33 is arranged to reflect light upwardly and downwardly, which have been transmitted through the beam splitter 23 and reflected by the reflection mirror 24, respectively. Upper and lower quarter-wavelength plates 34 and 32 are arranged on the optical paths above and below the total reflection prism 33, respectively. Each of the upper and lower quarter-wavelength plates 34 and 32 transmits the light while converting linearly polarized beam into a circularly polarized beam or converting a returning circularly polarized beam into a linearly polarized beam.

The optical pickup device further includes upper and lower objective lenses 35 and 31, each of which are arranged between each of the upper and lower quarter-wavelength plates 34 and 32 and each of upper and lower optical discs 40 and 41. Each objective lens can be moved in tracking and focusing directions. The tracking and focusing movements of the objective lenses 35 and 31 are respectively controlled by individual tracking coils 36, 38 and focusing coils 37, 39. The objective lenses 35 and 31 focus the beams on the recording layers of the upper and lower optical discs 40 and 41, convert the light reflected by the optical discs 40 and 41 into collimated beams, and return the collimated beams to the beam splitter 23, respectively. At the other side of the beam splitter 23, a condensing lens 25 is arranged to condense the light which has been reflected by and transmitted through the beam splitter 23 after returning thereto by the reflection of the optical discs 40 and 41, respectively. A prism 26 is arranged at the front of the condensing lens 25 to transmit a portion (such as half) of the incident light but to reflect the remaining portion of the incident light. The optical pickup device of the present invention further includes two optical detectors, that is, a tracking optical detector 29 and a focusing optical detector 28. The tracking optical detector 29 is arranged at the front of the prism 26 and detects and converts the light, transmitted through the prism 26, into the form of an electric signal. The focusing optical detector 28 is arranged at a side of the prism 26 and receives the light, reflected by the prism 26, by way of a cylindrical lens 27 to detect and convert the light into the form of an electric signal.

During operation of the optical pickup device, the light of the light source 21 is collimated by the collimating lens 22 into a collimated beam which is in turn received by the beam splitter 23. Upon reception of the collimated beam, the beam splitter 23 transmits the P-wave component, which is parallel to the incident surface, but reflects the S-wave component, which is normal to the incident surface.

The P-wave, transmitted through the beam splitter 23, is in turn reflected by an upper reflection surface 33a of the total reflection prism 33 and received by the upper quarter-wavelength plate 34 where the linear polarized incident light is converted into circular polarized light. The circularly polarized light is, thereafter, focused on a data recording layer, or the bottom layer, of the upper optical disc 40 by the upper objective lens 35.

The light focused on the upper optical disc 40 is in turn reflected by the optical disc 40. Its reflection quantity as well as its angle of diffraction is determined in accordance with data recorded on each point of the recording layer of the optical disc 40. In this case, the incident light of the optical disc 40 is in the form of circularly polarized light which is normal to the incident surface. The reflected light is in the form of a circularly polarized light, which is normal to the incident surface, while being diffracted to a direction opposite to that of the incident light.

The circularly polarized light reflected by the upper optical disc 40 is received by the upper quarter-wavelength plate 34 by way of the upper objective lens 35. At the upper quarter-wavelength plate 34, the circularly polarized light is converted into linearly polarized light and reflected by the upper reflection surface 33a of the total reflection prism 33, and received by the beam splitter 23. In this case, since the light reflected by the upper reflection surface 33a of the total reflection prism 33 is the linearly polarized light which is normal to the incident surface, this light is reflected by the beam splitter 23 and received by the condensing lens 25.

The condensing lens 25 condenses the incident light and applies the condensed light to the prism 26. A part of the incident light of the prism 26 is transmitted through the prism 26, and thereafter, applied to the tracking optical detector 29 while the other part of the incident light is reflected by the prism 26 to be received by the focusing optical detector 28 by way of the cylindrical lens 27. The light received by the detectors 28 and 29 are detected and converted into the form of electric signals by the detectors 28 and 29, respectively, thereby achieving access to information stored on the upper optical disc 40.

On the other hand, the light which has been generated by the light source 21 and reflected by the beam splitter 23, is reflected by the reflection mirror 24 to the front of the beam splitter 23. The light is, thereafter, reflected by a lower reflection surface 33b of the total reflection prism 33.

The light reflected by the lower reflection surface 33b of the prism 33 is received by the lower quarter-wavelength plate 32 where linearly polarized light is converted into circularly polarized light. The circularly polarized light is, thereafter, focused on a data recording layer, or an upper layer, of the lower optical disc 41 by the lower objective lens 31.

At the lower optical disc 41, rotated by a common shaft 30, the incident light on the disc 41 is in the form of circularly polarized light which is normal to the incident surface. The reflection light is reflected by the optical disc 41 in the form of circularly polarized light, which is parallel to the incident surface, while being diffracted to a direction opposite to that of the incident light.

The circularly polarized light reflected by the lower optical disc 41 is received by the lower quarter-wavelength plate 32 through the lower objective lens 31. At the lower quarter-wavelength plate 32, the circularly polarized light is converted into linearly polarized light. The linearly polarized light is, in turn, reflected by the lower reflection surface 33b of the total reflection prism 33 and the reflection mirror 24 in series and received by the beam splitter 23. In this case, since the light reflected by the lower reflection surface 33b of the total reflection prism 33 is the linearly polarized light which is normal to the incident surface, this light is transmitted through the beam splitter 23 and received by the condensing lens 25.

The condensing lens 25 condenses the incident light and applies the condensed light to the prism 26. A part of the incident light is transmitted through the prism 26 and received by the tracking optical detector 29, while the other part of the incident light is reflected by the prism 26 and received by the focusing optical detector 28 by way of the cylindrical lens 27. Upon reception of the light, the detectors 28 and 29 detect the light and convert it into the form of electric signals, respectively. As a result, access of information stored on the lower optical disc 40 is achieved.

Briefly described, the light of the light source 21 is split into two light beams, which travel individual optical paths, by the beam splitter 23 and which are received by the upper and lower optical discs 40 and 41, respectively. On the other hand, the light, reflected by the upper and lower optical discs 40 and 41, respectively, passes through optical paths opposite to those of the incident light and is received by the condensing lens 25 by way of the beam splitter 23. Hence, the present invention achieves, using one optical pickup device, the access of the upper and lower optical discs of the lay-built structure without turning the pickup device over.

Here, it is impossible to access the upper and lower optical discs 40 and 41 at the same time, so that access to the upper and lower optical discs 40 and 41 should be individually accessed. In order to achieve such individual access, the lower objective lens 31 is deflected by the coil 39 when the upper optical disc 40 is accessed. In the same manner, the upper objective lens 35 is deflected by the coil 37 when the lower optical disc 41 is accessed.

Figure 4:
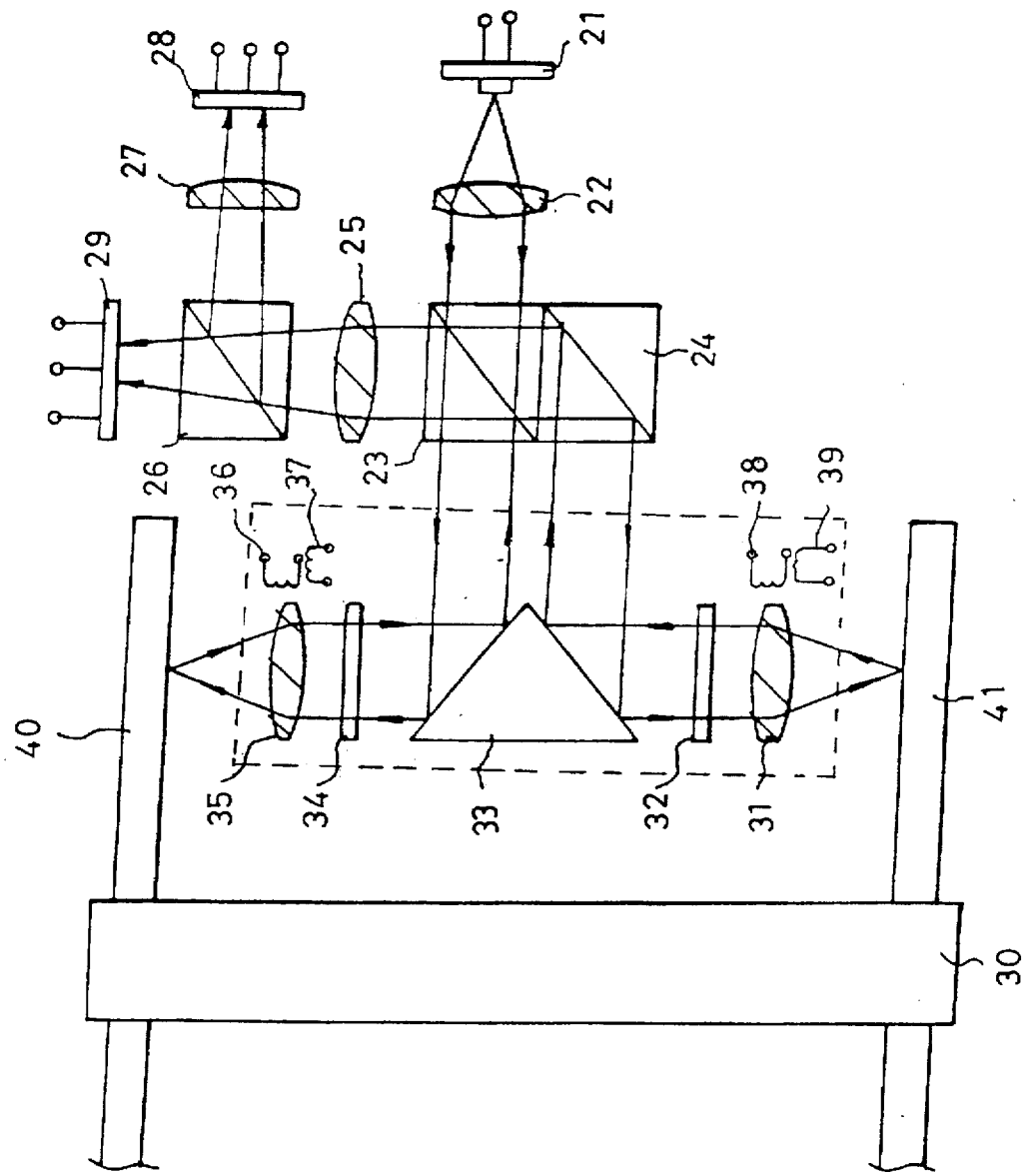
FIG. 4 is a view corresponding to FIG. 3, showing another embodiment of the present invention.

Turning to FIG. 4, there is shown an optical pickup device according to a second embodiment of the present invention. In the second embodiment, the components of the optical pickup device as well as their arrangement remain the same as in the primary embodiment of FIG. 3, but the movement of the components with respect to the optical discs 40 and 41 is altered to reduce the access time as well as to facilitate the manufacture of the pickup device. That is, in the primary embodiment, all of the components constitute a pickup movement which is horizontally movable (as a unit) with respect to the optical discs 40 and 41 and the other elements of the optical system. However, in the second embodiment, the total reflection prism 33, the quarter-wavelength plates 34 and 32, the objective lenses 35 and 31, the tracking coils 36 and 38 and the focusing coils 37 and 39 constitute the pickup, which is horizontally movable with respect to the optical discs 40 and 41. The remaining components of the second embodiment, that is, the light source 21, the collimating lens 22, the beam splitter 23, the reflection mirror 24, the condensing lens 25, the prism 26, the cylindrical lens 27 and the two optical detectors 28 and 29 are in a fixed position to a side of the pickup movement.

In view of such an altered arrangement, the optical pickup device according the second embodiment is of reduced weight, thereby achieving a reduction in the access time as compared to the first embodiment as well as facilitating manufacture.

As described above, the optical pickup device according to the present invention accesses, using one optical pickup device provided with one light source, upper and lower optical discs of a lay-built structure without turning the pickup device over, thereby reducing the access time as well as the space for the optical pickup device. Furthermore, the optical pickup device of the present invention simplifies the construction, facilitates the manufacture and reduces the manufacturing cost in comparison with the conventional systems which use two optical pickup devices, so that it is efficiently used in access of lay-built optical discs.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical pickup apparatus for a disc recorder/player unit comprising:

a light source for generating linearly polarized light;

a beam splitter for passing a first component of the light which is parallel to an incident surface of said beam splitter therethrough along a first direction and for reflecting a second component of the light which is vertical to the incident surface along a second direction perpendicular to the first direction;

a reflector, disposed along a first side of said beam splitter, for reflecting the light reflected along the second direction by said beam splitter into a direction parallel to the first direction;

total reflection means for respectively reflecting the light transmitted through said beam splitter upward off a first exterior face thereof and the light reflected by said reflector downward off a second exterior face thereof, relative to the optical pickup apparatus;

upper conversion means for converting the light upwardly reflected by said total reflection means into light which is circularly polarized, focusing the circularly polarized light on an upper disc mounted within the disc recorder/player unit, and converting the light reflected by the upper disc into parallel beams of light which are linearly polarized;

lower conversion means for converting the light downwardly reflected by said total reflection means into light which is circularly polarized, focusing the circularly polarized light on a lower disc mounted within the disc recorder/player unit, and converting the light reflected by the lower disc into parallel beams of light which are linearly polarized, said upper and lower conversion means respectively passing the light converted to linearly polarized form to said total reflection means which reflects the light towards said beam splitter and said reflector, which respectively reflect the light along a third direction opposite the second direction;

a half prism for passing therethrough along the third direction a first half of the light incident thereon from said beam splitter and said reflector and for reflecting a second half of the light along a fourth direction opposite the first direction;

tracking detector means for detecting and converting the light passed through said half prism into a tracking control signal;

focusing detector means for detecting and converting the light reflected by said half prism into a focus control signal; and focus control means for controlling said upper and lower conversion means to focus either one of the light upwardly reflected by said total reflection means or the light downwardly reflected by said total reflection means respectively on the upper disc or the lower disc and concurrently deflecting the other of the light upwardly reflected and the light downwardly reflected by said total reflection means to an out of focus state with the upper disc or the lower disc respectively so that the light incident on said half prism corresponds substantially to either the light reflected by the upper disc or the light reflected by the lower disc.

2. The optical pickup apparatus of claim 1, wherein said upper and lower conversion means comprise quarter wavelength plates.

3. The optical pickup apparatus of claim 1, further comprising a collimating lens, disposed between said light source and said beam splitter, for converting the light generated by said light source into parallel light and for passing the parallel light onto the incident surface of said beam splitter.

4. The optical pickup apparatus of claim 1, further comprising a condensing lens for condensing and passing the light respectively reflected by said beam splitter and said reflector onto said half prism.

5. The optical pickup apparatus of claim 1, wherein the light upwardly and downwardly reflected by said total reflection means are reflected colinearly with respect to each other.

6. An optical pickup device comprising:

a light source for generating light;

a collimating lens for converting the light of said light source into a collimated beam, said collimating lens being arranged in front of said light source;

a beam splitter, having a front surface thereof positioned away from the light source, and a surface for transmitting the p-polarization component of said collimated beam through said front surface, and for reflecting the s-polarization component of said collimated beam, said beam splitter being arranged in front of said collimating lens;

a reflection mirror for reflecting the light, reflected by said beam splitter, through said front surface of said beam splitter, said reflection mirror being arranged at a first side of said beam splitter;

a total reflection prism, positioned for receiving p-polarization and s-polarization light beams transmitted by the front surface of said beam splitter, and for concurrently reflecting the beams upwards and downwards, respectively, said total reflection prism being arranged in front of said beam splitter;

upper and lower quarter-wavelength plates, each respectively located above and below said total reflection prism, for converting and transmitting the respective p-polarization and s-polarization components into circularly polarized light beams, and for converting and transmitting returning circularly polarized light beams into linear polarized light beams, said upper and lower quarter-wavelength plates being respectively arranged on reflection paths above and below said total reflection prism;

upper and lower objective lenses for focusing the respective circularly polarized light beams transmitted through said upper and lower quarter-wavelength plates onto recording layers of upper and lower optical discs, for converting the respective circularly polarized light beams reflected from said upper and lower optical discs into collimated beams, and for returning said collimated beams to said total reflection prism, said upper and lower objective lenses being respectively arranged between said upper and lower quarter-wavelength plates and said upper and lower optical discs, each objective lens being movable in vertical directions under control of a focusing coil to non-concurrently focus each of said circularly polarized light beams onto said upper and lower optical discs, and movable in horizontal directions under control of a tracking coil;

a condensing lens for condensing the light beams, reflected by said upper and lower optical discs, that are reflected from said total reflection prism and directed to said condensing lens by reflection from said beam splitter or said reflection mirror, respectively, said condensing lens being arranged at a second side of said beam splitter that is opposite said first side;

a partial reflection prism for transmitting therethrough a portion of the light incident thereon and for reflecting the remaining portion of the light incident thereon, said partial reflection prism being arranged to receive the light from said condensing lens;

a tracking optical detector for detecting and converting the light transmitted through said partial reflection prism into a tracking electric signal; and a focusing optical detector for receiving the light reflected by said partial reflection prism, by way of a cylindrical lens, and for detecting and converting said light into a focusing electric signal.

7. The optical pickup device according to claim 6, wherein said total reflection prism, said upper and lower quarter-wavelength plates, said upper and lower objective lenses, and said tracking and focusing coils are housed within a pickup that is horizontally movable with respect to said upper and lower optical discs.

8. An optical pickup apparatus for a disc recorder/player unit comprising:

a light source for generating linearly polarized light;

a beam splitter for transmitting a first polarization component of the light incident on a surface of said beam splitter in a first direction and for reflecting a second polarization component of the light which is incident on said surface along a second direction perpendicular to the first direction;

a reflector, disposed along a first side of said beam splitter, for reflecting the light reflected along the second direction by said beam splitter into a direction parallel to the first direction;

total reflection prism means for concurrently reflecting the light polarization component that was transmitted through said beam splitter upward off a first exterior face thereof and reflecting the light reflected by said reflector downward off a second exterior face thereof so as to be collinear with respect to the light upwardly reflected off the first exterior face;

upper conversion means for converting the light upwardly reflected by said total reflection prism means into light which is circularly polarized, passing the circularly polarized light toward an upper disc mounted within the disc recorder/player unit, and converting the light reflected by the upper disc into light which is linearly polarized;

lower conversion means for converting the light downwardly reflected by said total reflection prism means into light which is circularly polarized, passing the circularly polarized light toward a lower disc mounted within the disc recorder/player unit, and converting the light reflected by the lower disc into light which is linearly polarized;

said upper and lower conversion means respectively transmitting the light which has been reflected from the respective disc to said total reflection prism means, which in turn reflects the beams of light towards said beam splitter and said reflector, respectively, each of which reflect the light incident thereon along a third direction opposite the second direction;

a partial reflection prism for transmitting therethrough a first portion of the light incident thereon from said beam splitter and said reflector and for reflecting a second portion of the light along a fourth direction opposite the first direction;

tracking detector means for detecting and converting the light passed through said partial reflection prism into a tracking control signal; and focusing detector means for detecting and converting the light reflected by said partial reflection prism into a focus control signal.

9. The optical pickup apparatus of claim 8, further comprising:

an upper objective lens, disposed between said upper conversion means and the upper disc, for focusing the circularly polarized light from said upper conversion means onto the upper disc and passing the light reflected by the upper disc to said upper conversion means; and a lower objective lens, disposed between said lower conversion means and the lower disc, for focusing the circularly polarized light from said lower conversion means onto the lower disc and passing the light reflected by the lower disc to said lower conversion means.

10. The optical pickup apparatus of claim 9, and further comprising:

a first pair of tracking and focusing coils for driving tracking and focusing operations of said upper objective lens in accordance with the tracking and focus control signals when the optical pickup apparatus accesses the upper disc; and a second pair of tracking and focusing coils for driving tracking and focusing operations of said lower objective lens in accordance with the tracking and focus control signals when the optical pickup apparatus accesses the lower disc; wherein said optical pickup apparatus accesses the upper and lower discs non-concurrently.

11. The optical pickup apparatus of claim 8, wherein said upper and lower conversion means comprise quarter-wavelength plates.

12. The optical pickup apparatus of claim 8, further comprising a collimating lens, disposed between said light source and said beam splitter, for converting the light generated by said light source into collimated light and for passing the collimated light onto the incident surface of said beam splitter.

13. The optical pickup apparatus of claim 8, further comprising a condensing lens passing the light respectively reflected by said beam splitter and said reflector onto said partial reflection prism.

14. The optical pickup apparatus of claim 8, wherein the partial reflection prism reflects 50% of the light and transmits 50% of the light.

* * * * *